US011601898B2

(12) United States Patent
Lee

(10) Patent No.: US 11,601,898 B2
(45) Date of Patent: Mar. 7, 2023

(54) INTEGRATED COMMUNICATION POWER SYSTEM SWITCHING BETWEEN AC-TO-DC, DC-TO-DC, AND MAXIMUM POWER POINT TRACKING MODES

(71) Applicant: DELTA ELECTRONICS, INC., Taoyuan (TW)

(72) Inventor: Wen-Chang Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/353,104

(22) Filed: Jun. 21, 2021

(65) Prior Publication Data

US 2021/0400601 A1 Dec. 23, 2021

Related U.S. Application Data

(60) Provisional application No. 63/042,244, filed on Jun. 22, 2020.

(30) Foreign Application Priority Data

May 28, 2021 (CN) .......................... 202110592747.0

(51) Int. Cl.
*H04W 52/36* (2009.01)
*H02J 50/20* (2016.01)
(Continued)

(52) U.S. Cl.
CPC ........... *H04W 52/367* (2013.01); *H02J 50/20* (2016.02); *H02M 3/1582* (2013.01); *H04B 1/04* (2013.01); *H04B 1/1607* (2013.01)

(58) Field of Classification Search
CPC . H04W 52/0245; H04W 88/06; H04W 88/02; H04W 52/245; H04W 52/0209;
(Continued)

(56) References Cited

U.S. PATENT DOCUMENTS

2014/0049117 A1* 2/2014 Rahman .................. H02J 1/102
307/82
2020/0091855 A1* 3/2020 Pevear .............. H01M 10/4242
(Continued)

FOREIGN PATENT DOCUMENTS

CN 201877478 U 6/2011
CN 208890461 U 5/2019

*Primary Examiner* — Golam Sorowar
(74) *Attorney, Agent, or Firm* — Muncy, Geissler, Olds & Lowe, P.C.

(57) ABSTRACT

An integrated communication power system supplies power to a communication equipment, and the communication equipment includes a base station module and an antenna processing module. The integrated communication power system includes a first transfer switch, a first integrated conversion module, a DC conversion module, and an energy storage module. The first transfer switch selectively switches one of input sources and a renewable energy to be coupled to the first integrated conversion module to receive an input voltage. The first integrated conversion module converts the input voltage into a DC voltage, and the DC conversion module provides an output voltage to supply power to the antenna processing module according to the DC voltage. The energy storage module receives an energy storage voltage provided by the first integrated conversion module or the DC conversion module to supply power to the base station module.

13 Claims, 9 Drawing Sheets

(51) Int. Cl.
  *H04B 1/16*     (2006.01)
  *H04B 1/04*     (2006.01)
  *H02M 3/158*    (2006.01)

(58) Field of Classification Search
  CPC . H04W 52/0261; H04W 52/52; H04W 84/12; H04W 52/02; H04W 76/10; H04W 52/0277; H04W 52/028; H04W 52/0296; H04W 52/146; H04W 52/42; H04W 52/283; H04W 52/367; H02J 3/381; H02J 50/10; H02J 50/80; H02J 7/02; H02J 50/20; H02J 7/00714; H02J 7/007182; H02J 2300/24; H02J 50/12; H02J 7/00036; H02J 2300/28; H02J 4/00; H02J 50/40; H02J 50/90; H02J 7/00047; H02J 7/0042; H02J 7/34; H02J 7/00; H02J 2207/20; H02J 2300/40; Y02E 10/56; Y02E 10/76; Y02E 60/10; Y02E 70/30; Y02E 10/72; Y02E 10/728; Y02E 60/00; Y02E 60/50; Y02E 10/50; Y02E 40/30; Y02E 40/40; Y02E 40/50; Y02E 40/70; Y02E 40/20; Y02D 30/70; Y02D 10/00
  See application file for complete search history.

(56) References Cited

U.S. PATENT DOCUMENTS

2020/0274375 A1*   8/2020   Griffiths ................ B60R 16/033
2020/0395771 A1*   12/2020   Hiratsuka ............. H02J 7/0025
2022/0147091 A1*   5/2022   Liu ........................ H02J 3/381

\* cited by examiner

INTEGRATED COMMUNICATION POWER SYSTEM SWITCHING BETWEEN AC-TO-DC, DC-TO-DC, AND MAXIMUM POWER POINT TRACKING MODES

CROSS-REFERENCE TO RELATED APPLICATION

This patent application claims the benefit of U.S. Provisional Patent Application No. 63/042,244, filed Jun. 22, 2020, which is incorporated by reference herein.

BACKGROUND

Technical Field

The present disclosure relates to an integrated communication power system, and more particularly to an integrated communication power system applied to 5G communication equipment.

Description of Related Art

The statements in this section merely provide background information related to the present disclosure and do not necessarily constitute prior art.

As the communication technology is becoming more and more developed, the communication structure of 4G has been gradually developed to the communication structure of 5G. With the application of 5G and the development of future smart networks, if the communication power supply system is upgraded from the 4G system to the 5G system, the power consumption will significantly increase. Before the vigorous development of the green energy industry, the input source was mostly mains electricity, and when the mains electricity is interrupted, a generator and/or a battery are used for backup power.

However, in the existing power supply system, if the output power capacity is to be expanded, it depends on not only whether the power supply module needs to be increased, but also whether the power of the mains electricity is limited. With the development of the global green energy industry, solar cells and wind power generation continue to rise. In particular, the price of solar cells has also continued to drop, and they have been attractively used in power supply system applications, especially the system architecture that is conducive to 5G power supply systems. Even so, this application requires the purchase of photovoltaic chargers (PV chargers; PVCs) in addition to site construction and purchase of photovoltaic panels, which will increase capital expenditure (CAPEX) investment.

In addition, there is a certain distance between the output end of the base station under the electric tower of the power supply system and the active antenna processing unit/remote radio unit (AAU/RRU), and this distance will bring a certain amount of power loss (i.e., line loss) transmitted by the power line. In the application of 5G and future power supply systems, due to the increase in the power of the equipment on the electric tower, if the power line capacity is not increased, the line loss of this part of the power line will increase much more than before. Therefore, how to reduce the loss of this part is also an urgent issue.

Accordingly, the present disclosure provides an integrated communication power system to switch the corresponding operation modes according to multiple input voltages, such as DC, AC, and renewable energy to reduce the capital expenditure of investment and make it more flexible in applications.

SUMMARY

In order to solve the above-mentioned problems, the present disclosure provides an integrated communication power system. The integrated communication power system supplies power to a communication equipment, and the communication equipment includes a base station module and an antenna processing module. The integrated communication power system includes at least one first transfer switch, at least one first integrated conversion module, a DC conversion module, and an energy storage module. The at least one first transfer switch includes at least two input ends and one output end, one of the input ends is coupled to a renewable energy and the other input end is coupled to an input source, and the at least one first transfer switch selectively switches one of the input ends to couple to the output end to provide an input voltage. The at least one first integrated conversion module is coupled to the output end, and converts the input voltage into a DC voltage. The DC conversion module is coupled to the at least one first integrated conversion module and a power line, and the DC conversion module provides an output voltage to supply power to the antenna processing module coupled to the power line according to the DC voltage. The energy storage module is coupled to the DC conversion module, and the energy storage module receives an energy storage voltage provided from the at least one first integrated conversion module or the DC conversion module to supply backup power to the base station module. The at least one first integrated conversion module includes an input voltage detection unit of detecting the input voltage so as to selectively switch the at least one first integrated conversion module to work in an AC-to-DC mode or a maximum power point tracking mode according to the input voltage.

The main purpose and effect of the present disclosure is to use the integrated conversion module to switch to AC-to-DC mode, the DC-to-DC mode, and the maximum power point tracking mode according to the input voltage so as to reduce the capital expenditure of investment and make the integrated communication power system have more flexible application effects.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
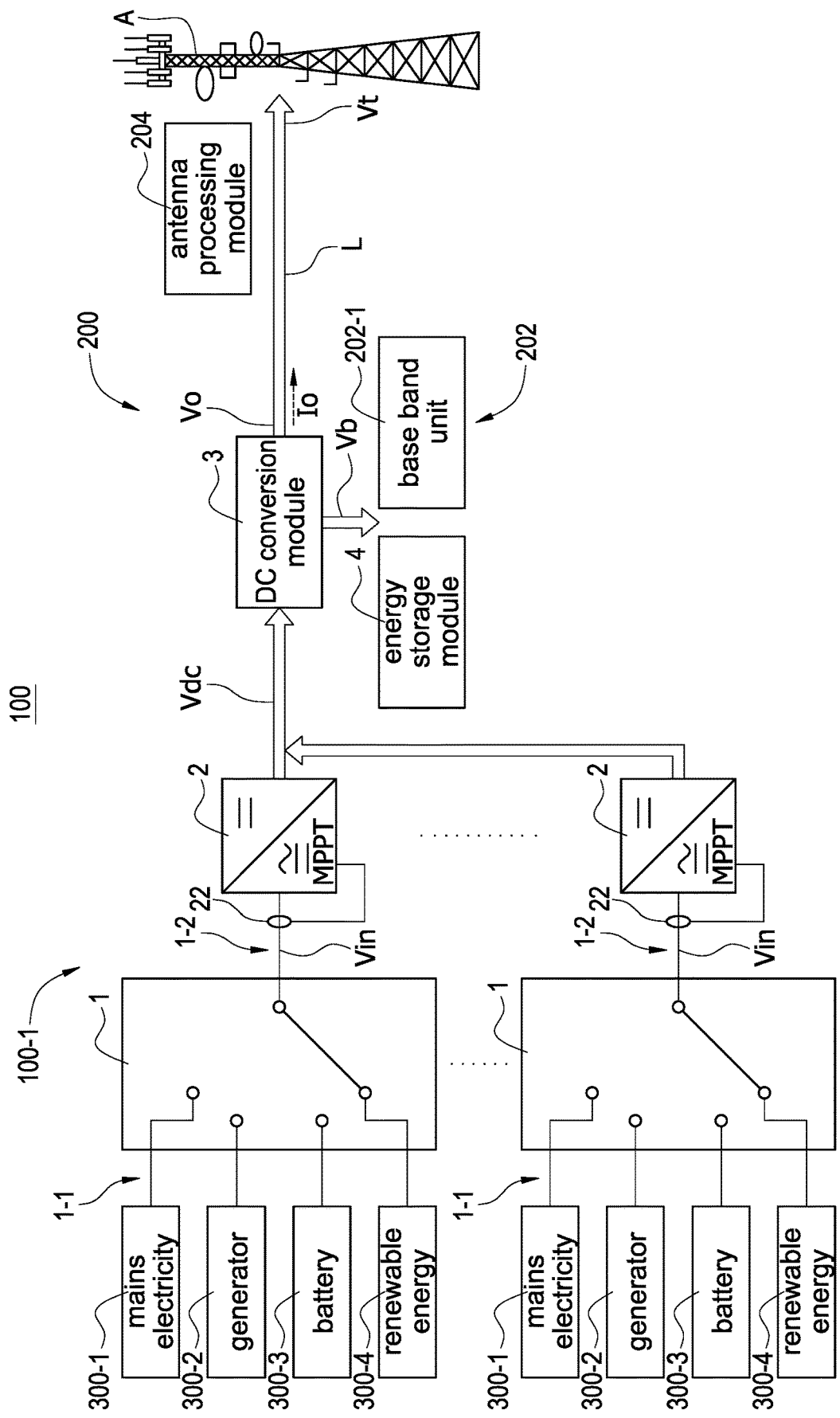
FIG. 1 is a system architecture diagram of an integrated communication power system according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a system architecture diagram of an integrated communication power system according to the present disclosure. The integrated communication power system 100 is used to supply power to a communication equipment 200. The communication equipment 200 includes a base station module 202 and an antenna processing module 204. The base station module 202 includes a base band unit (BBU) 202-1. The base band unit 202-1 is installed in an under-tower equipment under the electric tower A, and can usually be installed in the same machine room 100-1 as the integrated communication power supply system 100. The antenna processing module 204 is a wireless transceiver device on the electric tower A, which may be composed of an active antenna processing unit (AAU) or a remote radio unit (RRU). The integrated communication power system 100 includes at least one transfer switch 1, at least one first integrated conversion module 2, a DC conversion module 3, and an energy storage module 4. The integrated communication power system 100 receives an input voltage Vin externally provided by, for example but not limited to, a mains electricity 300-1, a generator 300-2, a battery 300-3, or a renewable energy 300-4. In particular, the renewable energy 300-4 may be a solar energy, a wind power, a water power, a fuel cell, or other renewable electricity.

The transfer switch 1 includes at least two input ends 1-1 and an output end 1-2. As shown in FIG. 1, the transfer switch 1 includes four input ends 1-1. The input ends 1-1 of the transfer switch 1 are respectively coupled to, for example but not limited to, one of the mains electricity 300-1, the generator 300-2 and the battery 300-3, and the renewable energy 300-4. The transfer switch 1 is used to selectively switch one of the input ends 1-1 to the output end 1-2 so that the received input voltage Vin is provided from the selected input end 1-1 to the output end 1-2. It is assumed that one of the input ends 1-1 is coupled to the renewable energy 300-4 and the other of the input ends 1-2 is coupled to any power supply device (not shown) as an input source. The first integrated conversion module 2 is coupled to the output end 1-2 of the transfer switch 1 to convert the input voltage Vin into the DC voltage Vdc. The first integrated conversion module 2 is an integrated conversion module, that is, regardless of the DC input voltage Vin or AC input voltage Vin received by the input end, it can be converted by the integrated conversion module into the DC voltage Vdc. The first integrated conversion module 2 includes a voltage detection unit 22 for detecting the input voltage Vin. Therefore, the first integrated conversion module 2 selectively operates (works) in an AC-to-DC mode, a DC-to-DC mode, or a maximum power point tracking (MPPT) mode according to the input voltage Vin. The voltage detection unit 22 may be disposed outside the first integrated conversion module 2 or inside the first integrated conversion module 2 depending on actual application needs.

Specifically, when the mains electricity 300-1 or the generator 300-2 supplies power, the transfer switch 1 is switched (transferred) to connect the input end 1-1 coupled to the mains electricity 300-1 (or the generator 300-2) to the output end 1-2. Also, the first integrated conversion module 2 realizes that the input voltage Vin is supplied by the mains electricity 300-1 (or the generator 300-2) through the voltage detection unit 22. Therefore, the first integrated conversion module 2 selectively operates in the AC-to-DC mode to convert the AC input voltage Vin into the DC voltage Vdc. When the battery 300-3 supplies power, the first integrated conversion module 2 realizes that the input voltage Vin is supplied by the battery 300-3 through the voltage detection unit 22. Therefore, the first integrated conversion module 2 selectively operates in the DC-to-DC mode to convert the DC input voltage Vin into the DC voltage Vdc. When the renewable energy 300-4 supplies power, the first integrated conversion module 2 realizes that the input voltage Vin is supplied by the renewable energy 300-4 through the voltage detection unit 22. Therefore, the first integrated conversion module 2 selectively operates in the MPPT mode to convert the DC input voltage Vin into the DC voltage Vdc. The MPPT mode is used to mainly control the DC-to-DC conversion circuit to track the maximum power point to acquire the maximum power according to the input voltage Vin provided by the renewable energy 300-4. Therefore, when the input source is a solar cell, the first integrated conversion module 2 may be used as a photovoltaic charger (PV charger, PVC). The first integrated conversion module 2 may be implemented by a general two-stage converter with a control method. For example, when the voltage detection unit 22 detects that the input voltage Vin is alternating-current, the front-stage converter of the first integrated conversion module 2 is used as the PFC (power factor correction), and the rear-stage converter of the first integrated conversion module 2 is used to convert the output from the front-stage converter to an appropriate DC output. When the voltage detection unit 22 detects that the input voltage Vin is direct-current, the front-stage converter may be stopped or the front-stage converter is controlled to step up (boost) the output voltage. When the voltage detection unit 22 detects that the input voltage Vin varies (changes) with the loading and determines that the input source is the renewable energy 300-4, the front-stage converter is controlled to perform the maximum power point tracking.

Moreover, take the renewable energy 300-4 as a solar cell as an example, due to the problem of the installation of solar cells on the input side and the increase of capital expenditures (such as the application of the combination of the solar cells and the mains electricity 300-1), it is nothing more than the priority of solar cells to use green energy to reduce the cost of the power transformation. Only the part where the power supply of the solar cells is insufficient is provided by the mains electricity 300-1. Therefore, if the characteristics of the AC-to-DC conversion mode, the DC-to-DC conversion mode, and the photovoltaic charger can be integrated to become a multi-input functional application product, it will reduce the capital expenditure of investment and have more flexible applications.

The DC conversion module 3 is coupled to the first integrated conversion module 2 and the power line L, and provides the output voltage Vo according to the DC voltage Vdc to supply power to the antenna processing module 204 coupled to the other end of the power line L. The energy storage module 4 is coupled to the DC conversion module 3, and receives an energy storage voltage Vb provided by the first integrated conversion module 2 or the DC conversion module 3 to supply power to the base station module 202. Specifically, the energy storage module 4 is, for example but not limited to, a battery used to store electricity. When the input voltage Vin is sufficient, such as the mains electricity 300-1 is provided, the energy storage module 4 may receive and store the energy storage voltage Vb provided by the first integrated conversion module 2 or the DC conversion module 3, and the base station module 202 receives the energy storage voltage Vb to work. When the input voltage Vin is insufficient, for example but not limited to, the transfer switch 1 is switched or the supply of renewable energy 300-4 is insufficient, etc., the energy storage module 4 works to avoid the power interruption of the base station module 202 and the antenna processing module 204.

Figure 2A:
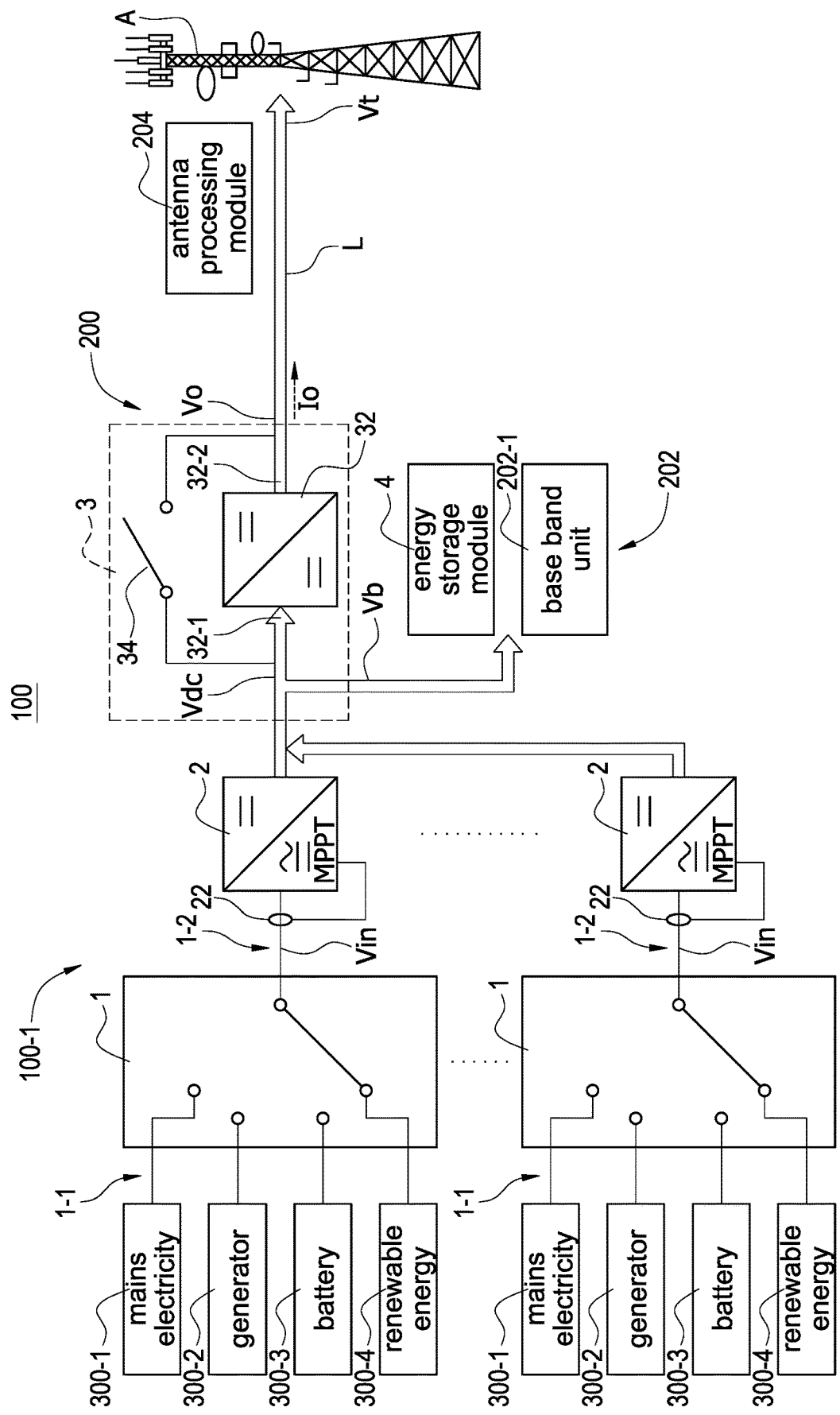
FIG. 2A is a block diagram of a DC conversion module according to a first embodiment of the present disclosure.

Please refer to FIG. 2A, which shows a block diagram of a DC conversion module according to a first embodiment of the present disclosure, and also refer to FIG. 1. The DC conversion module 3 includes a DC converter 32 and a bypass switch 34 connected in parallel. A first end 32-1 of the DC converter 32 is coupled to the first integrated conversion module 2. The energy storage module 4 and the base station module 202 are coupled to the first end 32-1 of the DC converter 32, and a second end 32-2 of the DC converter 32 is coupled to the power line L. In this circuit structure, the DC voltage Vdc provided by the first integrated conversion module 2 supplies power to the energy storage module 4 and the base station module 202, and therefore the DC voltage Vdc is the energy storage voltage Vb. When the input voltage Vin is sufficient, the DC conversion module 3 converts the DC voltage Vdc provided by the first integrated conversion module 2 into the output voltage Vo to supply power to the antenna processing module 204. When the input voltage Vin is insufficient, the energy storage module 4 provides the energy storage voltage Vb to the first end 32-1 of the DC converter 32, and the DC converter 32 converts the energy storage voltage Vb into the output voltage Vo to supply backup power to the antenna processing module 204.

The DC converter 32 may be a unidirectional boost converter to step up (boost) the DC voltage Vdc to the output voltage Vo so as to avoid insufficient terminal voltage Vt due to the line loss after the output voltage Vo passes through the power line L, and the higher voltage can reduce the line loss of the power line L. However, in addition to considering the line loss of the power line L, the conversion efficiency of the DC converter 32 must also be considered to avoid reducing the efficiency of the entire system. In other words, not only the line loss improvement of the power line L transmission but also the impact of these parameters need to be fully considered. Therefore, under different load conditions, there will be different adjustment mechanisms.

The advantages of the technology in the present disclosure are mainly calculated based on the level of the output voltage Vo (for example, 54 volts) provided by the integrated communication power system 100 and the present output current Io. The DC conversion module 3 calculates the output voltage Vo in order to maintain the terminal voltage Vt of the load terminal at a specific voltage (for example, 54 volts) and estimates that how much the line loss of the power line L can be reduced. Afterward, the additional power loss caused by the conversion efficiency of the DC converter 32 is compared with the reduced line loss of the power line L after the output voltage Vo level is adjusted to determine whether the DC converter 32 is to be worked, or the DC converter 32 is bypassed by turning on the bypass switch 34 so that the entire integrated communication power system 100 can achieve the highest efficiency.

Specifically, when the load of the DC converter 32 is not high, the conversion efficiency is poor, which causes additional loss. Since the load is not high, the current is relatively small, and the line loss on the power line L is not large, it may be considered to turn on the bypass switch 34 to save the loss of the DC converter 32.

Figure 2B:
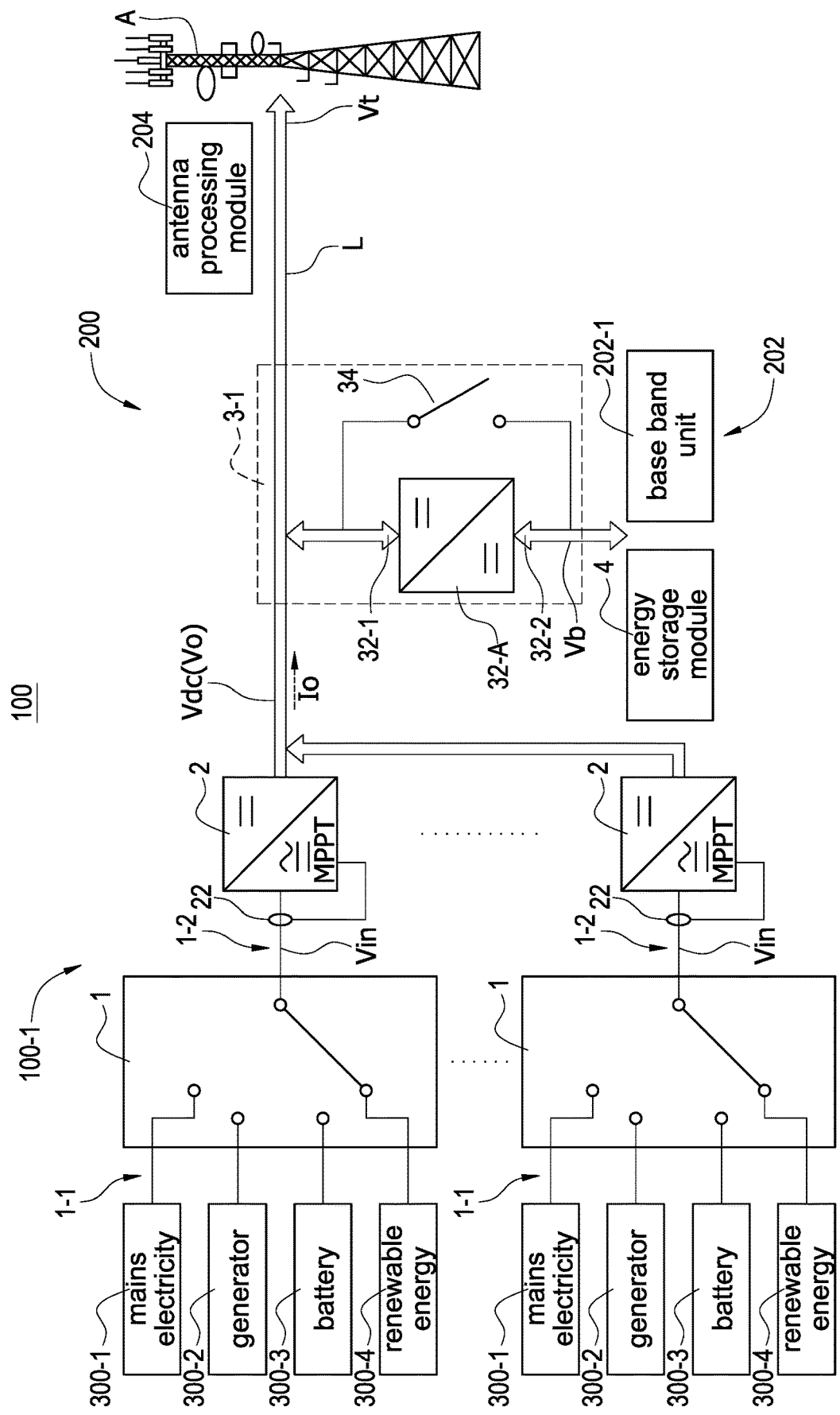
FIG. 2B is a block diagram of the DC conversion module according to a second embodiment of the present disclosure.

Please refer to FIG. 2B, which shows a block diagram of the DC conversion module according to a second embodiment of the present disclosure, and also refer to FIG. 1 to FIG. 2A. The DC conversion module 3-1 includes a DC converter 32-A and a bypass switch 34 connected in parallel, and the DC converter 32-A is a bidirectional buck boost converter. A first end 32-1 of the DC converter 32-A is coupled to the first integrated conversion module 2 and the power line L. The energy storage module 4 and the base station module 202 are coupled to a second end 32-2 of the DC converter 32-A. In this circuit structure, the DC voltage Vdc provided by the first integrated conversion module 2 supplies power to the antenna processing module 204 through the power line L, and therefore the DC voltage Vdc is the output voltage Vo of the DC conversion module 3-1. When the input voltage Vin is sufficient, the DC conversion module 3-1 converts (steps down) the DC voltage Vdc provided by the first integrated conversion module 2 into the energy storage voltage Vb to supply power to the energy storage module 4 and the base station module 202. When the input voltage Vin is insufficient, the energy storage module 4 provides the energy storage voltage Vb to the second end 32-2 of the DC converter 32-A, and the DC converter 32-A converts (steps up) the energy storage voltage Vb into the output voltage Vo to supply backup power to the antenna processing module 204.

It is similar to the embodiment in FIG. 2A, in order to acquire the highest efficiency of the entire integrated communication power system 100, the DC converter 32-A of the conversion module 3-1 may be selected to operate, or the bypass switch 34 is turned on to bypass the DC converter 32-A. When the energy storage voltage Vb is converted into the output voltage Vo to supply power to the antenna processing module 204, it is to determine whether to turn on the bypass switch 34 according to the load.

When the DC voltage Vdc is converted into the energy storage voltage Vb to supply power to the energy storage module 4, the DC conversion module 3-1 determines whether to turn on the bypass switch 34 according to the power loss caused by the present conversion efficiency since there is no need to calculate the line loss. Refer to FIG. 2A again, it can be seen that the output voltage Vo supplied to the remote antenna processing module 204 sometimes needs two-stage conversion, while the base station module 202 only needs one-stage conversion. If the power requirement of the base station module 202 is greater than the power requirement of the remote antenna processing module 204, the system structure of FIG. 2A may be used to acquire the highest efficiency of the entire integrated communication power system 100. On the contrary, if the power requirement of the base station module 202 is smaller than the power requirement of the remote antenna processing module 204, the system structure of FIG. 2B may be used to acquire the highest efficiency of the entire integrated communication power system 100.

Figure 2C:
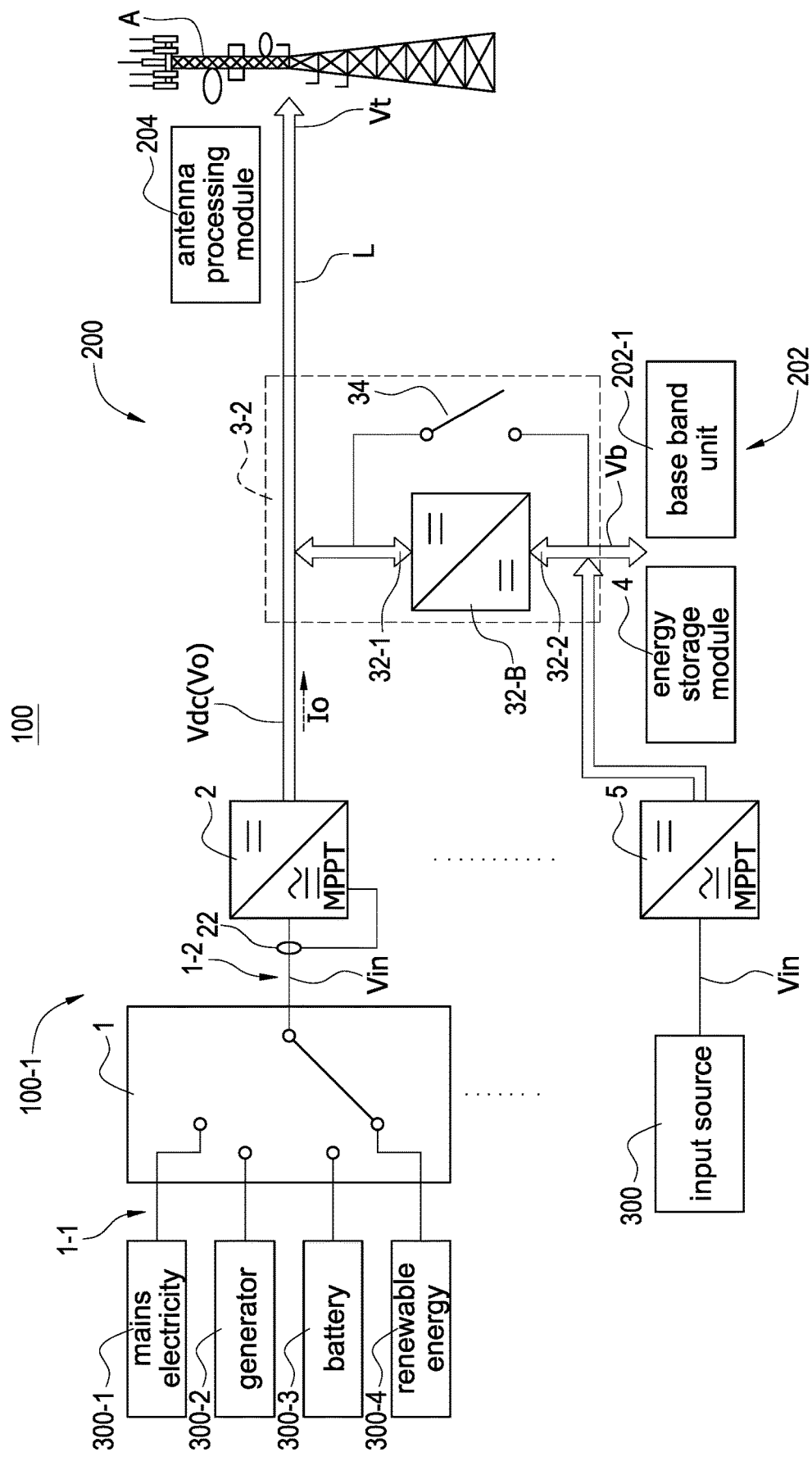
FIG. 2C is a block diagram of the DC conversion module according to a third embodiment of the present disclosure.

Please refer to FIG. 2C, which shows a block diagram of the DC conversion module according to a third embodiment of the present disclosure, and also refer to FIG. 1 to FIG. 2B.

The difference between the DC conversion module 3-2 of this embodiment (FIG. 2C) and the DC conversion module 3-1 of FIG. 2B is that the integrated communication power system 100 further includes at least a third integrated conversion module 5. An input end of the third integrated conversion module 5 is coupled to an input source 300, i.e., one of the power supply devices (not shown) including the mains electricity 300-1, the generator 300-2, the battery 300-3, and the renewable energy 300-4, or coupled to the output end 1-2 of the transfer switch 1. An output end of the third integrated conversion module 5 is coupled to a second end 32-2 of the DC converter 32-B, the energy storage module 4, and the base station module 202. The third integrated conversion module 5 is provided to use the power provided by power supply device (not shown) such as the mains electricity 300-1, the generator 300-2, the battery 300-3, or the renewable energy 300-4 as the input voltage Vin, and the input voltage Vin is converted into the energy storage voltage Vb to supply power to the energy storage module 4 and the base station module 202. The DC converter 32-B may be a unidirectional converter. The DC voltage Vdc provided by the first integrated conversion module 2 directly supplies power to the antenna processing module 204 through the power line L. The power source of the energy storage module 4 and the base station module 202 is converted by the third integrated conversion module 5. When the input voltage Vin is insufficient, the power stored in the energy storage module 4 can be converted (stepped up, boosted) into the output voltage Vo by the DC converter 32-B to provide backup power to the antenna processing module 204.

The circuit structure shown in FIG. 2C is mainly applicable to the power requirement of the base station module 202 being approximately equal to the power requirement of the remote antenna processing module 204. When the power supplied to the remote antenna processing module 204 and the base station module 202 is converted by only one stage, the benefits and efficiency of the application will be better. Therefore, according to this circuit structure, the highest efficiency of the entire integrated communication power supply system 100 can be acquired. In addition, the circuit structure of FIG. 2C is the same as that of FIG. 2A and FIG. 2B. In order to acquire the highest efficiency of the entire integrated communication power system 100, the DC converter 32-B is selected to operate, or the bypass switch 34 is turned to bypass the DC converter 32-B.

Figure 2D:
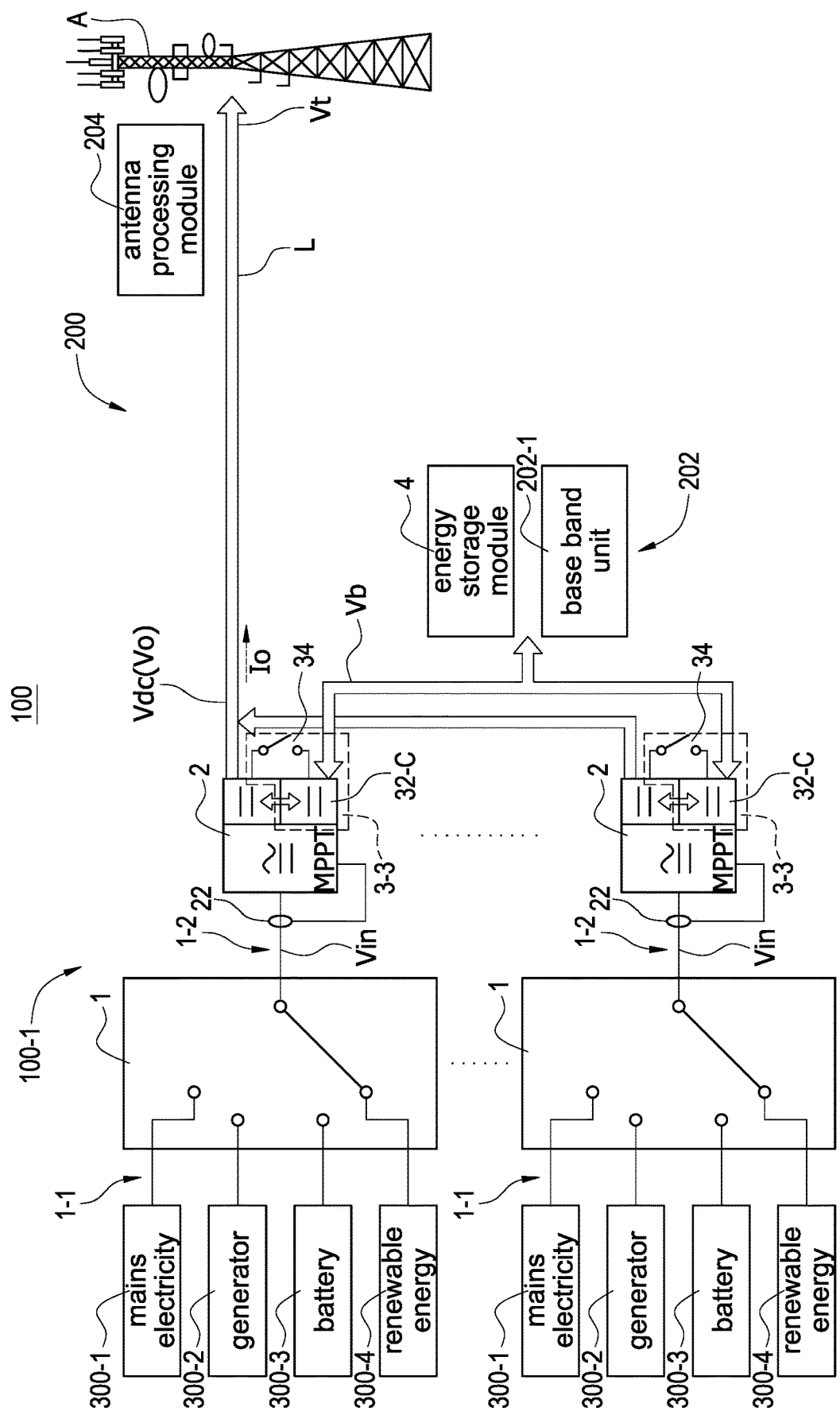
FIG. 2D is a block diagram of the DC conversion module according to a fourth embodiment of the present disclosure.

Please refer to FIG. 2D, which shows a block diagram of the DC conversion module according to a fourth embodiment of the present disclosure, and also refer to FIG. 1 to FIG. 2C. The difference between the DC conversion module 3-3 of this embodiment (FIG. 2D) and the DC conversion module 3-2 of FIG. 2C is that the DC converter 32-C is integrated with the first integrated conversion module 2. Therefore, the concept of multiple inputs and multiple outputs can be combined into an integrated module to simplify system configuration, reduce costs, fast deployment, simple maintenance, etc., to achieve the goal of optimal benefit and efficiency. In particular, the control method not mentioned in FIG. 2D is the same as that in FIG. 2C, and the detail description is omitted here for conciseness. Moreover, in one embodiment, the output voltage Vo provided by the DC conversion module 3 (including FIG. 2A to FIG. 2D) is not fixed, and the output voltage Vo will vary and be adjusted based on the conditions of the entire system, such as line loss, output current Io, and converter efficiency so that the efficiency of the entire integrated communication power system 100 is the highest by reducing overall power loss.

Figure 3A:
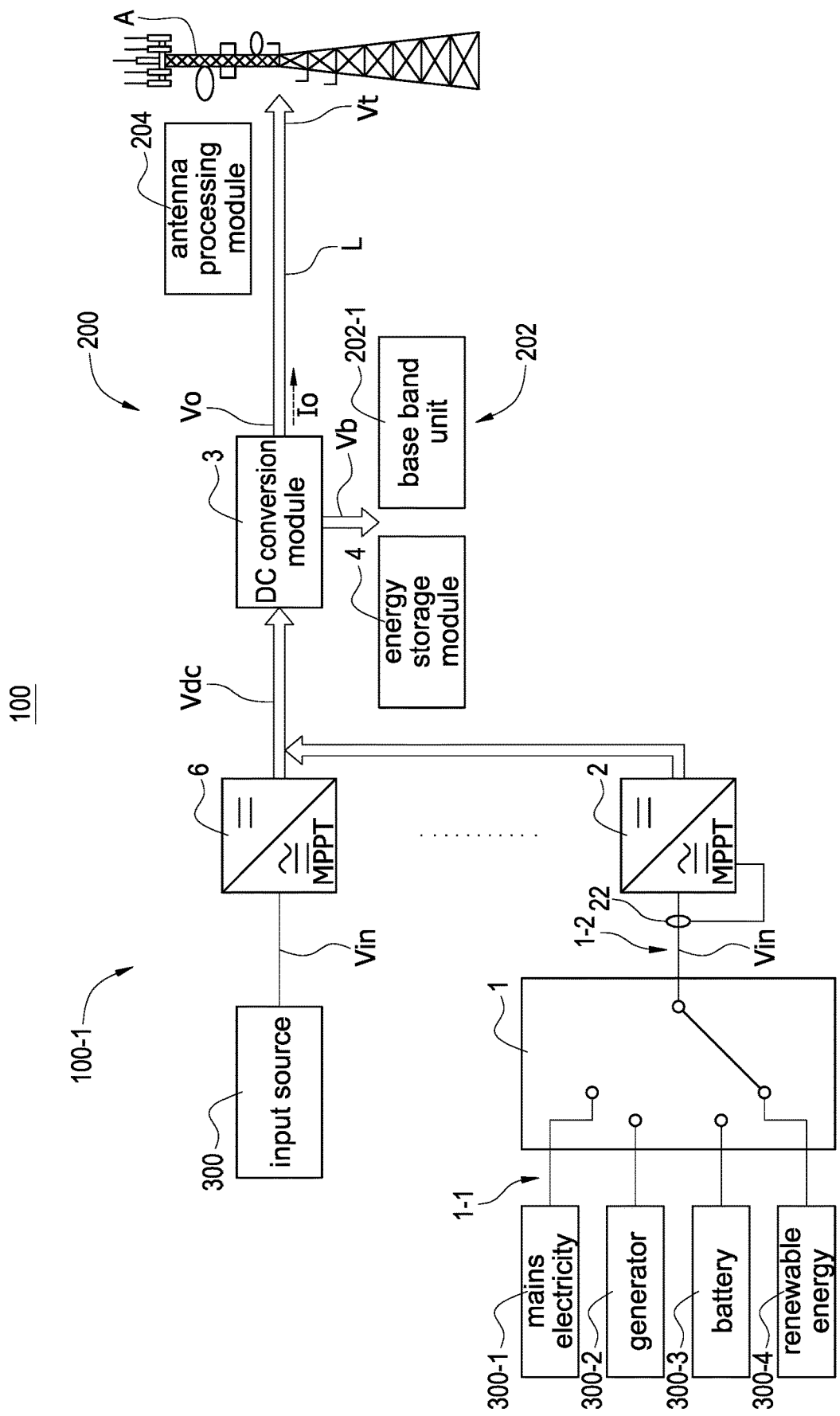
FIG. 3A is a system architecture diagram of the integrated communication power system according to a first derived embodiment of the present disclosure.

Please refer to FIG. 3A, which shows a system architecture diagram of the integrated communication power system according to a first derived embodiment of the present disclosure, and also refer to FIG. 1 to FIG. 2D. The integrated communication power system 100 further includes at least one second integrated conversion module 6. An input end of the second integrated conversion module 6 is coupled to an input source 300, i.e., one of the power supply devices (not shown) including the mains electricity 300-1, the generator 300-2, and the battery 300-3, and an output end of the second integrated conversion module 6 is coupled to the first end 32-1 of the DC conversion module 3. The second integrated conversion module 6 is provided to use the power provided by power supply device (not shown) such as the mains electricity 300-1, the generator 300-2, or the battery 300-3 as the input voltage Vin, and the input voltage Vin is converted into the DC voltage Vdc to the DC conversion module 3.

The advantage of this circuit structure is that the green energy (i.e., the renewable energy 300-4) has higher priority to supply power so as to reduce the cost of the mains electricity 300-1. If the power supply of the renewable energy 300-4 is insufficient, another more stable input source 300 will be added to supply power together. However, if the power capacity supplied by the renewable energy source 300-4 combined with the input source 300 still cannot meet the power demand of the entire system, an internal controller will switch the first transfer switch 1 from coupling to renewable energy 300-4 to coupling to the mains electricity 300-1, the generator 300-2, or the battery 300-3 to meet the power requirements of the entire integrated communication power system 100. This circuit structure also does not require to additionally purchase one photovoltaic charger, which can maximize the benefits of the entire system, reduce the space and capital expenditure for system configuration, and maximize the efficiency of the entire system.

Figure 3B:
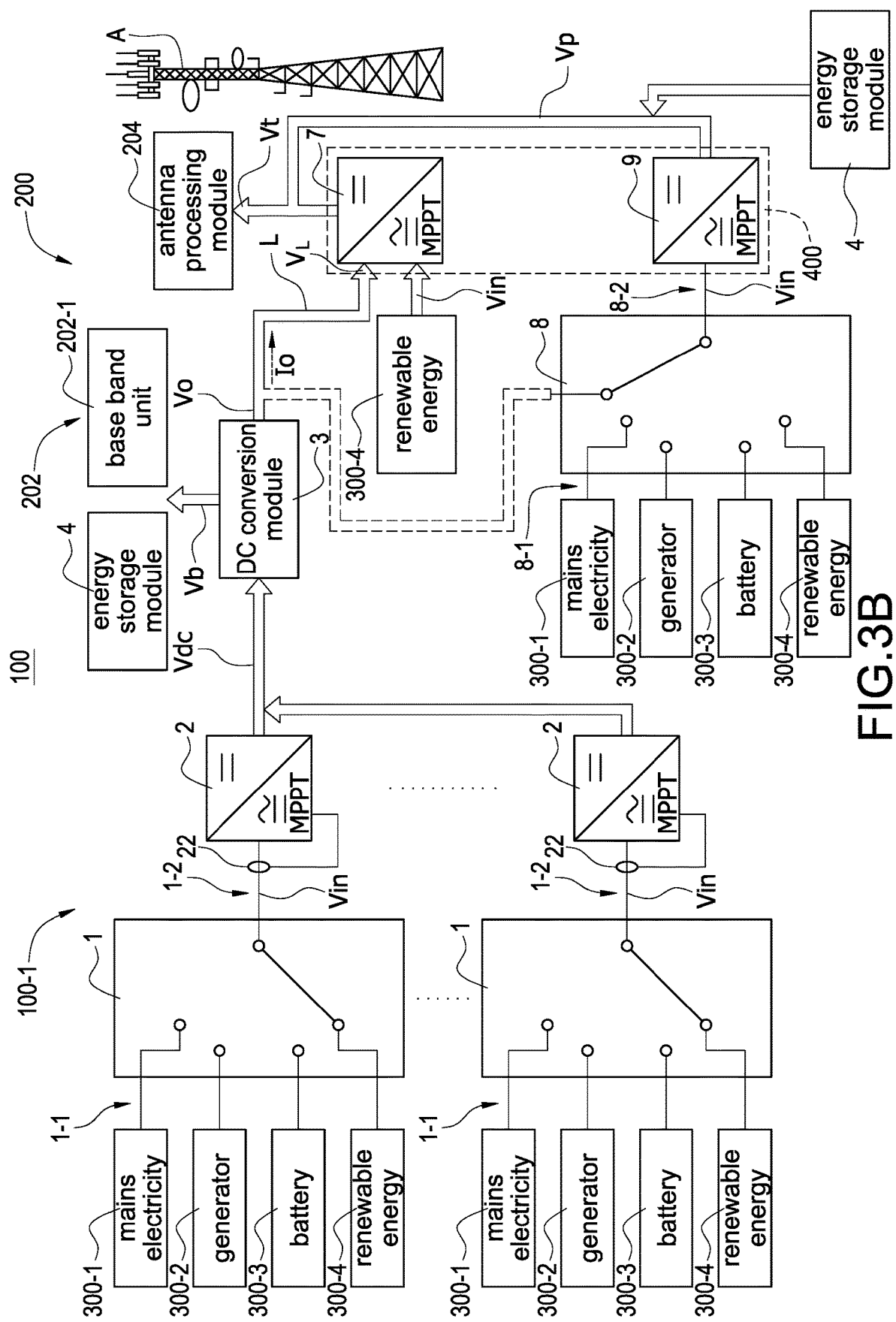
FIG. 3B is a system architecture diagram of the integrated communication power system according to a second derived embodiment of the present disclosure.

Please refer to FIG. 3B, which shows a system architecture diagram of the integrated communication power system according to a second derived embodiment of the present disclosure, and also refer to FIG. 1 to FIG. 3A. The integrated communication power system further includes a fourth integrated conversion module 7, a second transfer switch 8, and a fifth integrated conversion module 9. The fourth integrated conversion module 7 and the fifth integrated conversion module 9 (represented by dashed lines) provide two optional power-supplying paths for the antenna processing module 204, and one of the power-supplying paths is selected to supply power to the antenna processing module 204 according to actual conditions. An input end of the fourth integrated conversion module 7 is coupled to the power line L and the renewable energy 300-4, and an output end of the fourth integrated conversion module 7 is coupled to the antenna processing module 204. The fourth integrated conversion module 7 selectively receives the input voltage Vin provided by a power line voltage Vl of the power line L or by the renewable energy 300-4, and converts the power line voltage Vl or the input voltage Vin into the terminal voltage Vt to supply power to the antenna processing module 204. The fourth integrated conversion module 7 may be a step-down (buck) conversion module for stepping down the power line voltage Vl to the terminal voltage Vt suitable for the operation of the antenna processing module 204.

Specifically, in some implementations, the output voltage Vo needs to be increased higher, which is much higher than the maximum allowable operation voltage of the antenna processing module 204 since the length of the power line L is very long. In order to approximately fix the terminal voltage Vt of the load terminal at a certain voltage value and not exceed the maximum allowable operation voltage of the antenna processing module 204, another step-down device may be installed on the electrical tower A. Since the electrical tower A is particularly suitable for installing additional renewable energy devices such as solar cells or wind turbines, the fourth integrated conversion module 7 may be used to integrate the two power supply sources. When the renewable energy 300-4 is sufficient, the renewable energy 300-4 is provided to supply power; when the renewable energy 300-4 is insufficient, the power line L is added for supplying power. Accordingly, the power consumption (such as line loss, circuit power loss, etc.) of the integrated communication power system 100 can be saved.

The second transfer switch 8 includes at least two input ends 8-1 and one output end 8-2. One of the two input ends 8-1 is coupled to the power line L, and the other is coupled to one of power supply devices (not shown) such as the renewable energy 300-4, the mains electricity 300-1, the generator 300-2, or the battery 300-3. One of the input ends 8-1 is selectively switched to the output end 8-2. An input end of the fifth integrated conversion module 9 is coupled to the output end 8-2 of the second transfer switch 8, and the fifth integrated conversion module 9 supply power to the antenna processing module 204 through an output end of the fifth integrated conversion module 9. The fifth integrated conversion module 9 selectively receives a power line voltage Vl through the power line L or one of power supply devices (not shown) such as the renewable energy 300-4, the mains electricity 300-1, the generator 300-2, or the battery 300-3 as the input voltage Vin, and the input voltage Vin is converted into a suitable voltage for the antenna processing module 204. The fifth integrated conversion module 9 may be a step-down (buck) conversion module for stepping down the power line voltage Vl to the terminal voltage Vt suitable for the operation of the antenna processing module 204.

As shown in FIG. 3B, the fourth integrated conversion module 7, the second transfer switch 8, and the fifth integrated conversion module 9 are mainly directly installed on the electrical tower A to supply backup power the antenna processing module 204 for emergency needs. Since these modules are exposed to the outside, it is necessary to use an outer shell with ingress protection such as but not limited to IP65 protection to form the external power module 400 to avoid these modules damaged by damp. In addition, the external power module 400 includes an energy storage module 4, and the energy storage module 4 is coupled to the antenna processing module 204. When the antenna processing module 204 is in urgent need of power electricity but the power supply for the equipment under the electric tower is insufficient, the energy storage module 4 can provide emergency power to the antenna processing module 204. In particular, the advantage of using the power supply path of the fourth integrated conversion module 7 is that the renewable energy 300-4 may be directly installed on the electric tower, and therefore there is no need for additional wiring from the bottom of the electric tower to the top of the electric tower.

Figure 3C:
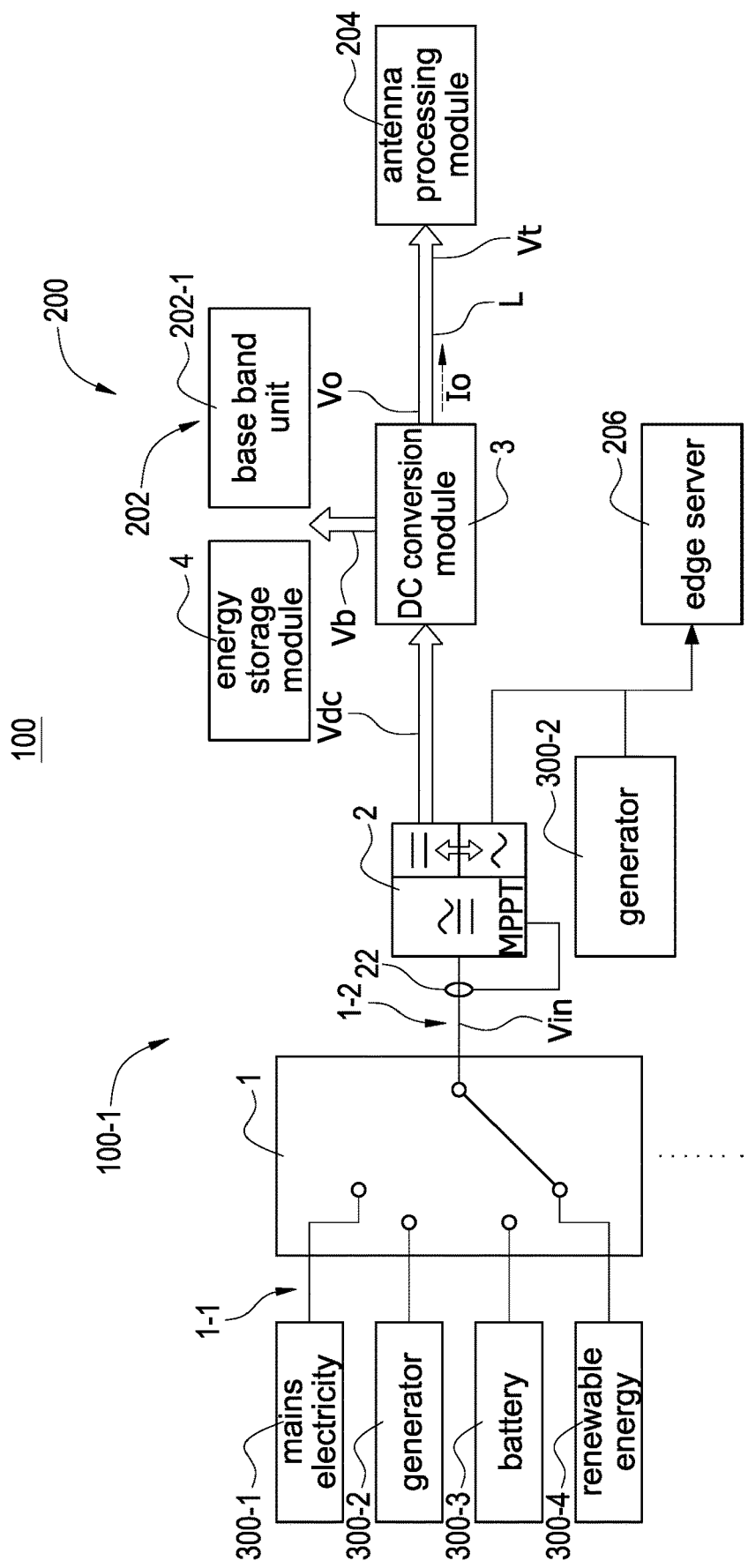
FIG. 3C is a system architecture diagram of the integrated communication power system according to a third derived embodiment of the present disclosure.

Please refer to FIG. 3C, which shows a system architecture diagram of the integrated communication power system according to a third derived embodiment of the present disclosure, and also refer to FIG. 1 to FIG. 3B. The communication equipment 200 further includes an edge server 206. The first integrated conversion module 2 is further integrated with an inverter circuit, and an output end of the inverter circuit is coupled to the edge server 206. The first integrated conversion module 2 converts the input voltage Vin into the AC voltage Vac through the integrated inverter circuit to supply power to the edge server 206. Specifically, if the integrated communication power system 100 needs to enhance mobile broadband, there will be a demand for an edge server 206 for high-traffic mobile broadband services and ultra-high reliability and ultra-low time delay communications (such as unmanned driving services, etc.).

The present input voltage requirement of the edge server is AC power electricity, and an AC-to-DC conversion circuit (rectifier) and an inverter circuit (inverter) are combined to form a bidirectional power conversion circuit (rectiverter). This structure not only makes the system structure simple, but also has the advantages of saving costs and increasing system efficiency. On the path from the output end of the inverter circuit to the edge server 206, the generator 300-2 may be added for emergency needs.

Figure 3D:
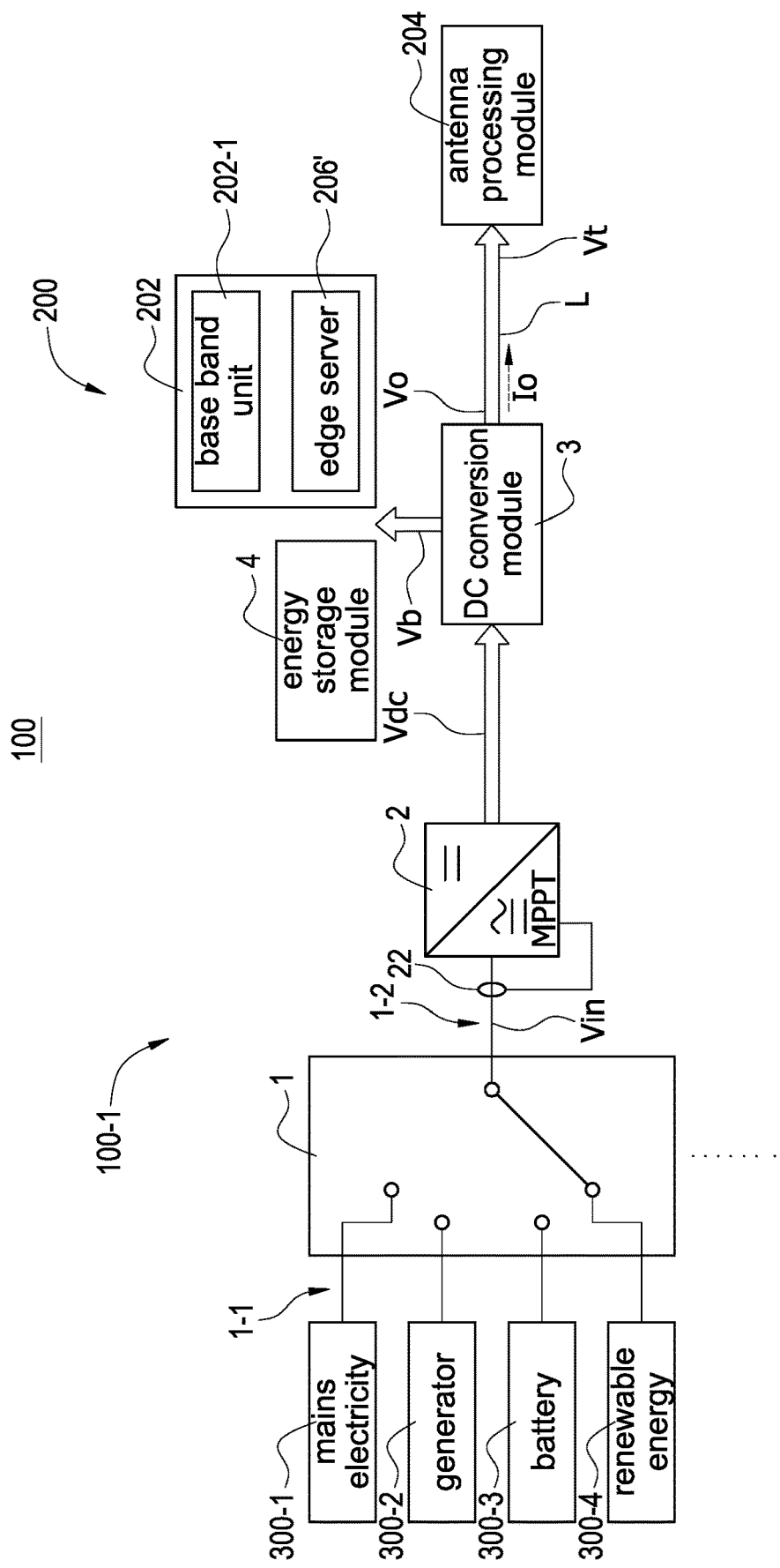
FIG. 3D is a system architecture diagram of the integrated communication power system according to a fourth derived embodiment of the present disclosure.

Please refer to FIG. 3D, which shows a system architecture diagram of the integrated communication power system according to a fourth derived embodiment of the present disclosure, and also refer to FIG. 1 to FIG. 3C. The difference between the embodiment (FIG. 3D) and the embodiment of FIG. 3C is that the base station module 202 includes a base band unit (BBU) 202-1 and an edge server 206'. The input voltage requirement of the edge server 206' is DC power electricity. When the input voltage Vin is sufficient, the DC voltage Vdc provided by the first integrated conversion module 2 not only supplies power to the base band unit 202-1 (using the energy storage voltage Vb), but also supplies power to the edge server 206' (using the DC voltage Vdc as the output voltage Vo as shown in FIG. 2B). When the input voltage Vin is insufficient, the energy storage voltage Vb provided by the energy storage module 4 provides backup power to the base band unit 202-1 and the edge server 206'.

In one embodiment, the features of the embodiments in FIG. 1 to FIG. 3D may be used in conjunction with the actual needs of the system. For example, but not limited to, the structure of the DC conversion module 3-1 in FIG. 2B and the power supply manner of the input voltage Vin in FIG. 3A, etc., are mainly based on the configuration requirements of the on-site communication equipment 200. In another embodiment, the integrated communication power system 100 may only include the first switch 1 and the first integrated conversion module 2 while omitting the DC conversion module 3. This special embodiment is mainly applied to systems with low line loss so that after deducting the line loss from the output voltage Vo, the terminal voltage Vt may still be maintained to meet the requirements of the antenna processing module 204.

In one embodiment, the inside of the second integrated conversion module 6 to the fifth integrated conversion module 9 is the same as the first integrated conversion module 2, and they all have a circuit that integrates the AC-to-DC conversion circuit (rectifier) and the DC-to-DC conversion circuit. If there are special requirements, the rectifier may also be combined with the inverter circuit (inverter) shown in FIG. 3C to become a bidirectional power conversion circuit (rectiverter). Moreover, the second integrated conversion module 6 to the fifth integrated conversion module 9 are the same as the first integrated conversion module 2, and may include an input voltage detection unit for detecting the input end of the integrated conversion module so as to selectively switch the first integrated conversion module 2 to work in the AC-to-DC mode, the DC-to-DC mode, or the MPPT mode according to the input voltage type of the input end of the first integrated conversion module 2.

Although the present disclosure has been described with reference to the preferred embodiment thereof, it will be understood that the present disclosure is not limited to the details thereof various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An integrated communication power system configured to supply power to a communication equipment, and the communication equipment comprising a base station module and an antenna processing module, the integrated communication power system comprising:
    at least one first transfer switch comprising at least two input ends and one output end, one of the input ends coupled to a renewable energy and the other input end coupled to an input source, and the at least one first transfer switch configured to selectively switch one of the input ends to couple to the output end to provide an input voltage,
    at least one first integrated conversion module coupled to the output end, and configured to convert the input voltage into a DC voltage,
    a DC conversion module coupled to the at least one first integrated conversion module and a power line, and the DC conversion module configured to provide an output voltage to supply power to the antenna processing module coupled to the power line according to the DC voltage, and
    an energy storage module coupled to the DC conversion module, and the energy storage module configured to receive an energy storage voltage provided from the at least one first integrated conversion module or the DC conversion module to supply backup power to the base station module,
    wherein the at least one first integrated conversion module comprises an input voltage detection unit of detecting the input voltage so as to selectively switch the at least one first integrated conversion module to work in an AC-to-DC mode or a maximum power point tracking mode according to the input voltage, and
    wherein the DC conversion module comprises a DC converter and a bypass switch connected to the DC converter in parallel; the at least one first integrated conversion module and the energy storage module are coupled to a first end of the DC converter, and a second end of the DC converter is coupled to the power line.

2. The integrated communication power system as claimed in claim 1, further comprising:
    at least one second integrated conversion module, each second integrated conversion module having an input end and an output end, the input end coupled to a second input source and the output end coupled to the DC conversion module, and configured to convert the power provided from the second input source into the DC voltage.

3. The integrated communication power system as claimed in claim 1, wherein the DC conversion module determines whether to turn on the bypass switch according to an output current of the DC conversion module.

4. The integrated communication power system as claimed in claim 1, wherein the DC converter is a unidirectional boost converter.

5. The integrated communication power system as claimed in claim 1, wherein the DC conversion module comprises a DC converter and a bypass switch connected to the DC converter in parallel; the at least one first integrated conversion module is coupled to a first end of the DC converter, and a third end of the DC converter is coupled to the energy storage module.

6. The integrated communication power system as claimed in claim 5, wherein the DC conversion module determines whether to turn on the bypass switch according to an output current of the DC conversion module.

7. The integrated communication power system as claimed in claim 5, wherein the DC converter is a bidirectional buck boost converter.

8. The integrated communication power system as claimed in claim 5, wherein the DC converter is a unidirectional boost converter, and the integrated communication power system further comprises:
    at least one third integrated conversion module, each third integrated conversion module having an input end and an output end, the input end coupled to a second input source and the output end coupled to the second end of the DC converter, and configured to convert the power provided from the second input source into the energy storage voltage to supply power to the energy storage module and the base station module.

9. The integrated communication power system as claimed in claim 1, further comprising:
    an integrated conversion module, the integrated conversion module having an input end and an output end, the input end coupled to the power line and a second renewable energy, and the output end coupled to the antenna processing module,
    wherein the integrated conversion module is configured to selectively convert a power line voltage of the power line or a second voltage provided from the second renewable energy into a terminal voltage to supply power to the antenna processing module.

10. The integrated communication power system as claimed in claim 1, further comprising:
    a second transfer switch comprising at least two input ends and one output end, one of the input ends coupled to the power line and the other input end coupled to a second input source, and is configured to selectively switch one of the input ends to couple to the output end, and
    an integrated conversion module, the integrated conversion module having an input end and an output end, the input end coupled to the output end of the second transfer switch, and the output end coupled to the antenna processing module,
    wherein the integrated conversion module is configured to selectively convert a power line voltage of the power line or a voltage provided from the second input source into a terminal voltage to supply power to the antenna processing module.

11. The integrated communication power system as claimed in claim 1, wherein the at least one first integrated conversion module comprises an AC-to-DC conversion circuit and a DC-to-DC conversion circuit, and the at least one first integrated conversion module is selectively switched to work in the AC-to-DC mode and the AC-to-DC conversion circuit is controlled, or is selectively switched to work in a DC-to-DC mode or the maximum power point tracking mode and the DC-to-DC conversion circuit is controlled.

12. The integrated communication power system as claimed in claim 11, wherein the at least one first integrated conversion module further comprises an inverter circuit, and an output end of the inverter circuit is coupled to an edge server; the at least one first integrated conversion module converts the input voltage into an AC voltage through the inverter circuit to supply power to the edge server.

13. The integrated communication power system as claimed in claim 1, wherein the base station module comprises a base band unit and an edge server providing a DC input; the at least one first integrated conversion module is configured to provide the DC voltage to supply power to the base band unit and the edge server, or the DC conversion module is configured to provide the output voltage to supply power to the base band unit and the edge server.

* * * * *